Nov. 21, 1967  A. R. SCHMOYER  3,353,435
APPARATUS FOR TEACHING THE OPERATION OF A
KEYBOARD-CONTROLLED MACHINE OR INSTRUMENT
Filed April 24, 1964
3 Sheets-Sheet 1
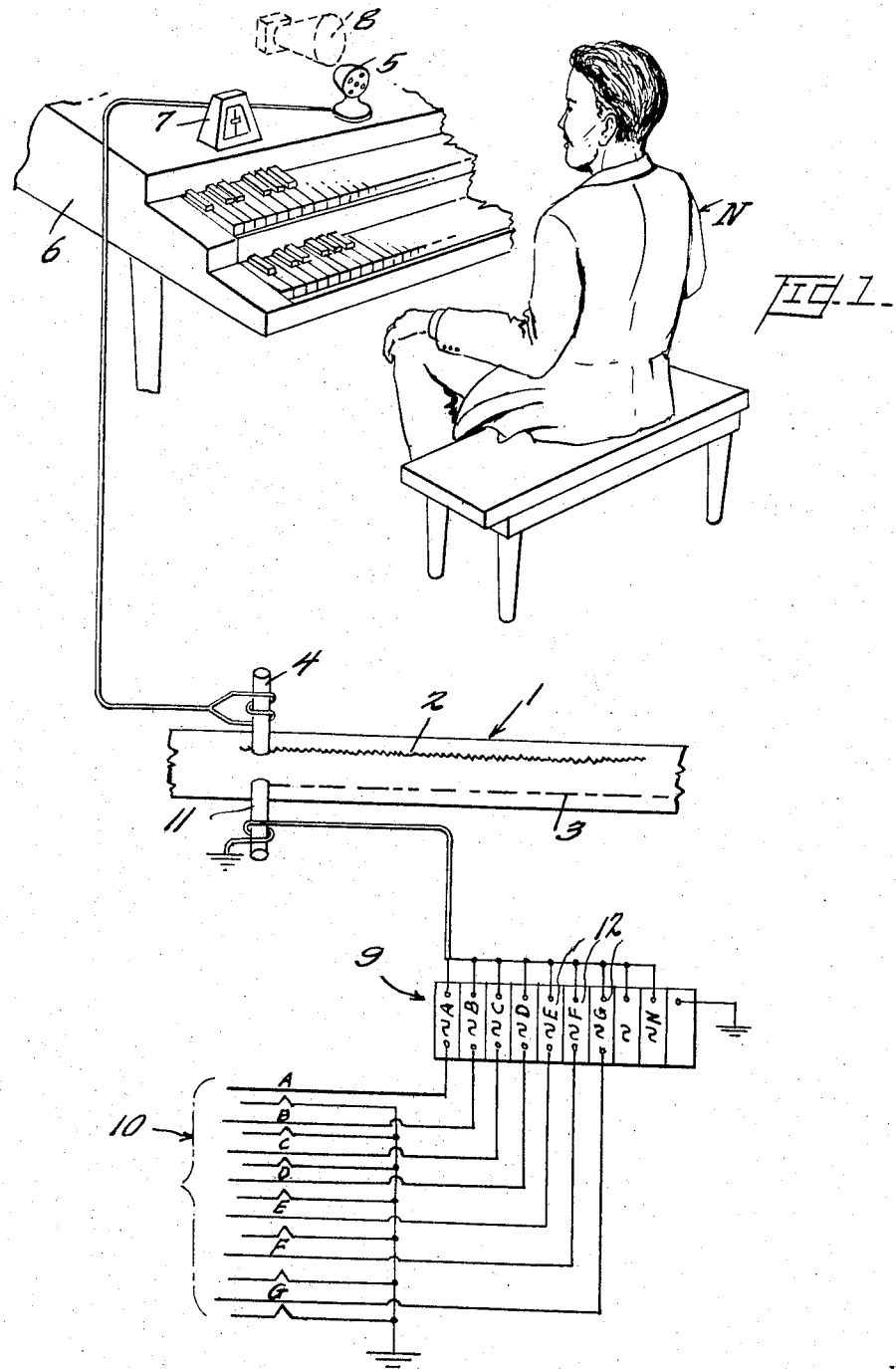
INVENTOR
Arthur R. Schmoyer,
BY
ATTORNEYS

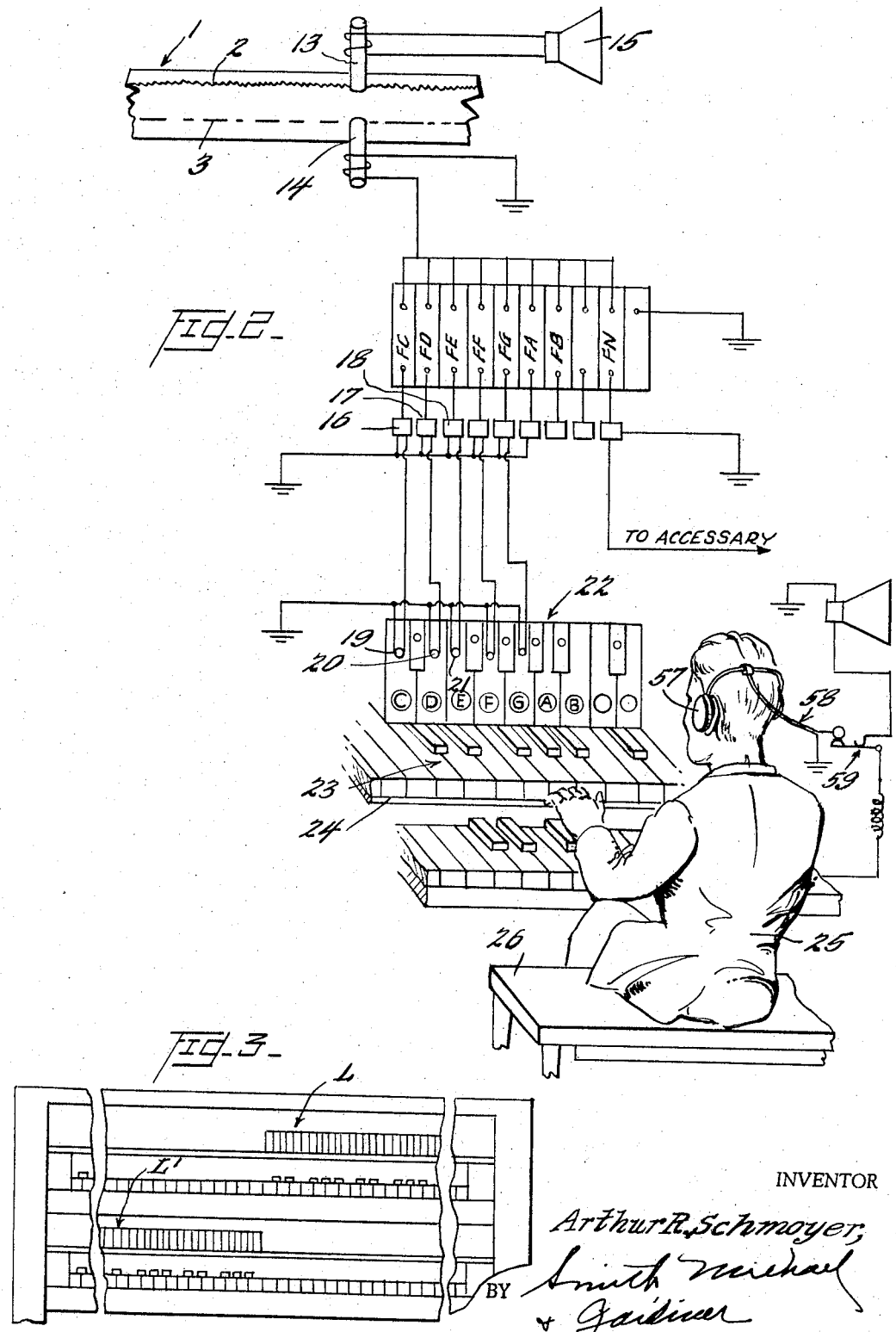

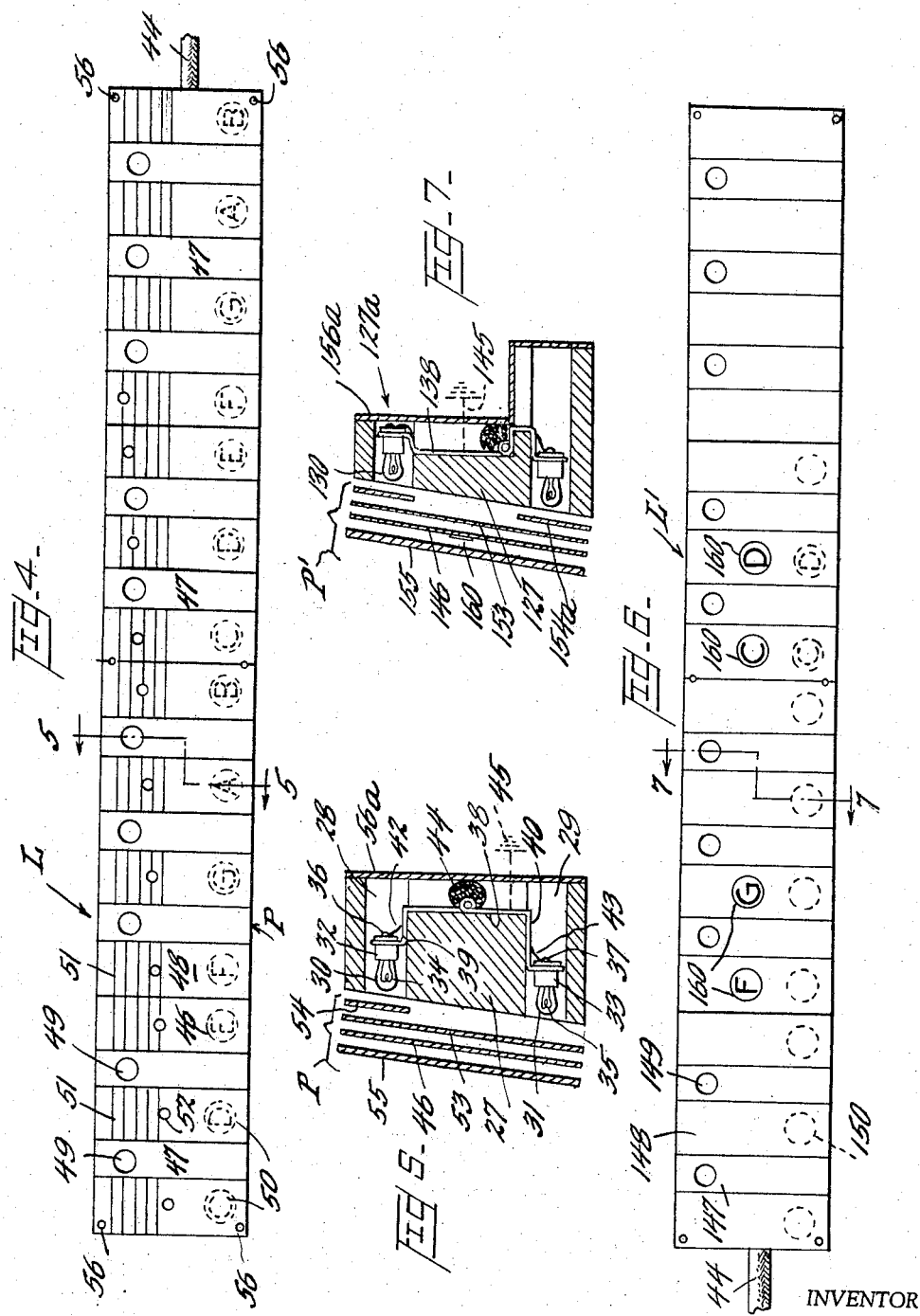

United States Patent Office 3,353,435
Patented Nov. 21, 1967

3,353,435
APPARATUS FOR TEACHING THE OPERATION OF A KEYBOARD-CONTROLLED MACHINE OR INSTRUMENT
Arthur R. Schmoyer, Falls Church, Va., assignor of fifty percent to Don S. Wenger, Bethesda, Md.
Filed Apr. 24, 1964, Ser. No. 362,360
4 Claims. (Cl. 84—478)

This invention is a method of and an apparatus for teaching a pupil or trainee to operate the mechanical control devices, such as keys, with which many present day machines and/or instruments are equipped, and which keys control the operating characteristics and functions of such machines. The invention is of general utility in the field of teaching and training but is particularly useful when applied in teaching one to play a keyboard instrument such as a piano or organ.

Previous attempts have been made to facilitate teaching or training in these fields by employing visual or audio aids, but so far as is known, none of these attempts have been entirely successful. Thus, some of the prior devices have required the presence of a teacher to operate some portion of the apparatus, see for instance Patents Nos. 3,080,661, 2,962,819 and 1,889,418. Other prior devices have required more or less drastic modifications of the instrument on which instruction is to be given, see for example Patents Nos. 2,909,956 and 3,091,152. The present invention contemplates the provision of combined visual and audio teaching aids which require no modification of the instrument on which instruction is being given, which is simple in construction and yet has proved to be quite effective in developing in the trainee a higher degree of precision and accuracy of performance than can be expected from devices of the prior art.

One object of the invention is to provide a combined visual-audio teaching aid for keyboard instruments, whereby a pupil or trainee may simultaneously receive visual and audio stimuli to aid him in the selection of the proper key to be operated to cause the machine or instrument to perform a predetermined function.

Another object of the invention is to provide a recording of voice instructions for the trainee, aided by a display device illustrating at least a portion of the keyboard of the instrument, and on which display the individual keys are identified by indicia symbolic of the machine function to be performed when a said key is actuated.

Another object of the invention is to provide means for rendering more discernible or more conspicuous the indicia associated with a key to be actuated, as shown on said display device, simultaneously with the vocal enunciation and identification of said key by said recorded voice instructions when played.

Another object of the invention is to provide illumination means associated with the individual indicia carried by the keys as depicted on said display device, and to selectively energize such means in timed relation to specific reference made to said keys in said recorded vocal instructions to the pupil.

Another object of the invention is to provide accurate synchronization of the vocal instructions and of the energization of predetermined indicia associated with the keys on said display device by placing on the record medium bearing the voice instructions, means for producing on "play-back" electric impulses which can be used to energize selectively one or more relays connected to control said illumination means. By properly orienting the impulse producing means with respect to the sound track of the vocal instructions, any desired timed relation between voice and impulse may readily be achieved.

Another object of the invention is to apply the impulse producing means to the record medium in code, and corresponding to and identified with different individual keys whereby on "read out" the electric impulses are in code and can be readily applied selectively to predetermined relays by simple known decoding apparatus. Any known form of coding and decoding apparatus may be employed, but it has been found convenient to employ a coding device by which impulses of selected frequency may be applied to the recording medium. Such impulses may be readily decoded by passing the output of a "read out" through a bank of bypass filters, all of which is suggested by such patents as 2,629,861 and 2,812,510.

A further object of the invention is to provide a keyboard indicator or display device which may be mounted on or in close proximity to the keyboard of an instrument on which instruction is to be given.

These and other objects of the invention will be apparent from a reading of the following specification in connection with the accompanying drawings wherein I have illustrated, by way of example, one adaptation of my invention, and wherein FIG. 1 is a diagrammatic representation of a manner of producing a composite record tape such as is used in practicing the present invention, FIG. 2 shows diagrammatically the manner in which the tape of FIG. 1 is passed through a "read out" apparatus to provide simultaneous mental stimuli effective upon the sense of hearing and the sense of sight of the trainee.

FIG. 3 is a front view of a two manual organ console with parts broken away and showing the keyboard indicators of the invention mounted therein.

FIG. 4 is a front elevation of a keyboard signal box for the upper manual of an organ keyboard.

FIG. 5 is a sectional view taken on the line 5—5 of FIG. 3.

FIG. 6 is a front elevation of a keyboard signal box for the lower manual of an organ keyboard.

FIG. 7 is a sectional view taken on the line 7—7 of FIG. 5.

As stated, the invention contemplates the provision of a composite recording which will form the basis for mental stimuli effective upon the senses of sight and hearing of the trainee and without the necessity of there being an operator or instructor present when the stimuli referred to are administered during the course of a lesson.

The composite record hereinbefore referred to may be a standard ¼ inch magnetic recording tape as indicated at 1 in FIG. 1. The tape 1 is designed to carry plural tracks, one of which indicated at 2 is a composite sound track, and the other indicated at 3 is a signal track comprising modulated areas which are effective on "play back" to generate electric impulses which may be used to control through appropriate relays, display apparatus to be hereinafter more particularly referred to. The tape 1 in FIG. 1 is shown diagrammatically in the process of passing through a conventional magnetic tape recorder. The recorder may include a magnetic recording head indicated at 4 to which a microphone 5 is connected. The microphone 5 is shown in proximity to an electric organ 6 and to a metronome 7. The loudspeaker or other tone producing facility of the organ 6 is represented diagrammatically at 8 to emphasize the fact that the microphone 5 is in "pickup" relation to the organ 6. Thus, the sound track 2 is a composite record of sound produced by a narrator N speaking into the microphone 5, and the sound of the organ 6, when a given key or keys thereof are actuated at such time as they are referred to by the narrator in the narrated instruction spoken by him into the microphone 5. In desired selected portions of the sound track 2 there may appear in the background, the audible beat of the metronome 7. The function and relation of the several sounds which comprise the sound track 2 will be fully explained hereinafter.

It is an important object of the present invention to associate with the sound track 2, on the recording strip 1, means for producing on play back, controlled electric impulses which are synchronized with or have a definite timed relation with respect to predetermined portions of the sound track 1, particularly those portions thereof in which recitation has been made of specific keys so that on play back stimuli effective upon the senses of hearing and sight of the pupil will be rendered simultaneously. The reproduced narrated instructions directly affect the sense of hearing of the pupil and the sense of sight of the pupil is stimulated by a display device bearing a pictorial representation of the keys of the instrument on which instruction is being given and in which display device by means hereinafter more fully described, a given key is identified simultaneously with reference thereto in the narrated instructions by rendering indicia associated with said key on the display device more conspicuous than or more readily discernible than other keys included in the display device. A convenient method of providing this desired synchronization or timed relation between the modulations comprising the signal track 3 with respect to selected portions of the composite sound track 2, may be accomplished by "dubbing in" the signal impulse modulations on play back of the composite sound track 2.

The invention contemplates assigning to each key of the instrument on which instruction is being given an identifying character symbolic of the respective notes or symbolic of the machine function to be performed in response to actuating a given key. These identifying and symbolic characters appear on the several keys depicted in the display device, previously referred to. Furthermore, the modulations applied to the tape 1 and comprising the signal track 3 are characterized in accordance with the identifying symbolic characters assigned to the respective keys, and which symbols appear on the keys as depicted in the display device. Thus, the invention contemplates modulating the record strip 1 in code characters corresponding to the several keys included in the keyboard of the instrument and which are depicted in the display device previously referred to.

Any known type of coding device may be employed for modulating the surface of the strip 1 since the coding device per se forms no part of the present invention. Conveniently, the coded modulations may be made by electric impulses of different frequencies generated by a series of electric oscillators which have been illustrated diagrammatically in FIG. 1 by the reference character 9. Each oscillator is designed to generate a current of distinguishing frequency and the several oscillators are selectively controlled by a bank of manually operated switches indicated generally by the reference character 10. Thus, as any of the switches 10 is operated to close a circuit through the oscillator, the output from the oscillator is directed through an electromagnetic recording head 11 as shown, so that a selected characterizing impulse or modulation is supplied to the body of tape 1. By way of example, in the present instance, the several keys have been assigned identifying characters as represented by the letters A, B, C, D, E, F, G . . . N, and these identifying characters appear in FIG. 1 on the several frequency channels similarly designated as at 12. In the signal track 3 the several coded impulses have been represented by modulated areas of different length, but it will be understood that this illustration is diagrammatic only and is for the purpose of indicating modulated areas corresponding respectively to different keys on the keyboard, which keys for convenience bear identifying characters A, B, C, . . . G, such as heretofore referred to. The multi-channel oscillator 9 and the switches 10 may be controlled by the narrator N or by a separate operator so that on play back of the composite sound track 2, the switches 10 may be actuated at proper intervals to impose on the strip 1 a modulated code signal oriented in respect to a selected portion of the sound track 2 in which specific recitation or reference to a corresponding key is made by the narrator.

By the method just described, which is by way of illustration only, the composite tape 1 will carry sound track 2 in which the narrator makes specific reference to predetermined, named keys to be operated by a trainee in a given timed sequence, and the signal track 3 will carry modulated areas corresponding to given keys on the keyboard and each being oriented with selected portions of the composite sound track 2 so that when the composite strip 1 is played back, the coded modulated areas of the signal track will generate in an electromagnetic reproducing head associated with the track, electric impulses synchronized or otherwise oriented in respect to time with the narrated reference to named keys on the keyboard so that, the signal impulses generated by the modulated areas of the signal track may be utilized to actuate through appropriate facilities now to be described, the display device in a manner to visually call the trainee's attention to a specific key.

In FIG. 2 there is shown diagrammatically the arrangement of the play back apparatus which includes two conventional electro-magnetic reproducing heads 13 and 14. The reproducing head 13 is connected to a loudspeaker 15 from which will flow the audible instructions to the pupil to actuate predetermined, named keys in a given timed sequence and thus stimulate the mind of the trainee through the sense of hearing.

Simultaneously, and in accurate synchronization with or other timed relation to the recited named keys in the reproduced instructions, the electromagnetic head 14 will pickup the coded impulse-producing modulations from the signal track 3 which impulses are, as previously suggested, arranged to provide stimuli effective upon the trainee through his sense of sight. It will be realized, of course, that the coded modulations of the signal track 3 will be picked up by the reproducing head 14 in a "scrambled" disorder and that means must be provided for "unscrambling" the resulting signal impulses in order to properly and selectively control the individual keys and the indicia carried thereby, as depicted on the display device previously referred to. To this end, the composite signal impulses picked up by the recording head 14 are delivered to a plurality of band path filters indicated at FC, FD, FE, etc., and the respective outputs of which are connected to control relays 16, 17 and 18, which in turn selectively control circuits to signal lights 19, 20 and 21, included in the display device which is indicated generally by the reference character 22 and which, in the arrangement shown in FIG. 2, is associated in close proximity with the keyboard 23 of the musical instrument 24 on which instruction is being given. The trainee T, indicated in dotted lines by the reference character 25 may be seated on a bench or stool 26 before the keyboard 23 of the instrument so that the signal lights 19, 20, 21 are clearly visible to him.

The display device indicated in FIG. 2 by the general reference character 22 is shown more particularly in FIGS. 4 and 5 of the drawings, to which more specific reference will be made hereinafter.

It will be noted in FIG. 2 that the display device includes a pictorial representation of the keys of the keyboard of the musical instrument 24 and that the pictorial representation of the several keys bear symbolic identifications such as the leters A, B, C, D, E, F, G . . . N, corresponding to the several frequency channels provided by the oscillator 9 in FIG. 1. Thus, a modulated area of the tape 1 resulting from an impulse from the frequency generator C associated with switch C of the bank of switches indicated at 10 in FIG. 1 will, when the tape 1 is passed through the dual head recording apparatus shown in FIG.

2 and the impulse properly channeled through the decoder filter channel FC and relay 16, cause the light 19 associated with the pictorial representation of the key C to be energized, thus rendering this key more conspicuous or more readily discernible than the other keys in the display device associated with the keyboard of the instrument before which the trainee is seated, and this illumination of the signal light 19 will occur simultaneously with the reference to this key in the reproduced narrative instruction so that the mind of the trainee is jointly stimulated by audible stimuli and the visual stimuli afforded by, on play back of, the recording on the strip 1.

It will be understood, of course, that although there has been illustrated in the drawings but a limited number of code and/or frequency channels, corresponding to the keys or notes in one octave, in actual practice there is provided as many code and/or frequency channels as are necessary to realize fully all of the advantages of the present invention. Thus, when the display device or devices, such as shown in FIGS. 4 and 6 are designed to serve two full octaves of a keyboard/s there would be provided a corresponding number of code and/or frequency channels. Furthermore, where a "lesson" includes reference to chords (which require the actuation of two or more keys simultaneously), additional code and/or frequency channels would be provided for such chord/s, together with appropriate circuit means whereby corresponding relays would control circuits to the two or more signal lamps associated with the keys comprised within such chords. Additional channels might also be provided to control accessory equipment or apparatus to which reference will later be made.

In FIGS. 1 and 2 I have shown code or frequency characters assigned to the "white" keys A, B, C, D, E, F and G, but it is to be understood that in practice I propose that the "black" keys A#, C#, D#, F# and G# be similarly identified by appropriate code or frequency characters and that the decoder will include band pass filters designed selectively to pass code impulses to appropriate relays which in turn selectively control signal circuits to the "black" keys on the respective indicators.

In FIGS. 4 and 5 I have shown by way of example, a preferred construction of a display device such as has been referred to hereinbefore. The display device of FIGS. 4 and 5 comprises a lamp box shown in transverse cross section in FIG. 4, and comprising a base member 27 provided with two vertically spaced rows of horizontal bores 28 and 29 extending front back through the base member 27. Within each of the bores 28 and 29 is positioned a signal lamp 30–31, said lamps being provided preferably with metal bases 32–33 respectively connected to one end of filaments 34–35, the opposite ends of which filament are connected to centrally exposed contacts 36–37. The lamps or bulb 30–31 may be mounted in any convenient manner within the bores 28 and 29 and by way of example I have shown the lamps mounted within apertures in a metal plate 38 secured to a rear face of the block 27 and carrying a plurality of lamp supporting arms 39–40, one of which extends into each of the bores 28 and 29. Each of the arms may be perforated to receive the metal base of a lamp and thus place one end of the filament thereof in contact with said plate 38, leaving the central contacts 36–37 exposed for connection to circuit wires 42–43 which, in turn, through cable 44 are connected to the respective relays 16, 17, 18, etc., as shown in FIG. 2. The cable 44 may pass from the lamp box through an appropriate aperture in an end wall thereof as shown in FIGS. 4 and 6. The plate 38 may be grounded as at 45. By this or any other equivalent or desired circuitry the individual lamps 30–31 may be selectively energized in response to actuation of the several relays 16, 17, 18, etc., as previously described.

The front face of the lamp box L or housing comprising the base 27 is closed by a multi-layered front panel member P, shown in FIG. 4, for the sake of clarity, with the several layers separated, and through which illumination emanating from lights 30–31 may be visible. In order to conveniently distinguish between the white keys and the black keys of the organ keyboard as depicted on the display device 22 in FIG. 2, the front panel P includes a sheet or panel member 46, such as a positive film strip, on which a desired number of keys of the instrument keyboard are illustrated substantially in scale measurement with the actual keys on the keyboard, so that as will hereinafter be described, when the display device is mounted in close proximity to the keyboard, the several keys as depicted on the display device will be in alignment with the actual keys on the keyboard as clearly shown diagrammatically in FIG. 2 and in FIG. 3. As shown in FIG. 4, the panel 46 depicts two full octaves of the keyboard.

On the panel member 46 the indicia indicating the black keys is preferably opaque black as indicated at 47, while the portions 48 indicating the white keys, are by contrast white. Each of the key representations 47 and 48 bears a light-transmitting area or window 49 and 50, respectively, which are in alignment respectively with the upper and lower rows of lights within the lamp box 27. To further individually characterize the keys in the display device, the representations of the white keys carry identifying indicia such as the letters A, B, C, D, . . . G, hereinbefore referred to, together with a representation of a musical staff as shown at 51 and on each such staff there is depicted a musical note 52 placed on the staff in a position indicating the place on the musical scale of the tones associated with the respective keys when struck. The identifying letters A, B, C, D, . . . G, are preferably displayed on the window area 50 as shown.

To the rear of the panel member 46 is a second panel member or sheet 53 of white translucent plastic to form a proper background coloring for the symbolic characters A, B, C, . . . G, which appear on the light-transmitting areas 50 of the white keys. Furthermore, to give a desired color contrast between the light-transmitting areas 50 of the white keys 48 and the light-transmitting areas 49 of the black keys 47, there is interposed between the panel 53 and the lamp box 27 a colored light-transmitting sheet 54 dimensioned to cover only the top row of lights 30 within the lamp box 27. The light-transmitting sheet 54 is preferably colored red so that when a selected one of the lamps 30 of the upper row of lamps is energized, that black key will be identified by a red spot at 49 as the light from the lamp box passes through the successive sheets or panels. If desired, a protecting fully transparent sheet or panel 55 may be provided as an outside protecting sheet for the multi-layer panel P covering the lamp box. The composite multi-layered panel member may be attached to the lamp box 27 in any convenient manner such as by a plurality of pins, screw members 56. A plate 56a of any desired form may close the rear of the lamp box 27.

In the illustrated embodiment of the invention, reference has been made to an "organ." It is contemplated that the "organ" is an electric organ according to present-day demands and that it comprises plural keyboards for operation by the hands of a player together with, if desired, a bank of foot pedals (not shown) to be operated by the feet of the player. It will be understood, therefore, that in actual practice there may be two display devices similar to each other but not necessarily exact duplicates of, the display device just described. The one just described is designed to be associated with the upper bank of keys and the other one of which will be associated with the lower bank of keys on a two manual organ as shown in FIG. 3. In such an arrangement the number of code frequency channels as represented in FIG. 1 will be expanded as necessary to comprehend the additional number of keys to be individually identified and similarly the decoding apparatus shown in FIG. 2 will be provided with a correspondingly increased number of band pass filters to supply electric impulses selectively to an appropriate number of relays.

I have shown in FIGS. 6 and 7 a preferred form of keyboard indicator L' for use on the lower manual of an organ. This indicator follows generally the construction of the display device for the upper manual as previously described but differs therefrom in the following respects. The multi-layer front panel P' includes a sheet in the form of a positive film strip 146 bearing indicia including black key and white key representations 147 and 148, respectively. Each black key 147 is provided with a clear display or signal area or window 149 positioned to be aligned respectively with the lamps 130 of the upper row of lamps in the lamp box 127. There are no "windows" in the white key areas 148 of the film strip 146, but provision is made for properly identifying these keys when the signal lamps 131 or the lower row of lamps in the box 127 are illuminated. To this end a sheet 153 of white translucent plastic is placed behind the film strip 146 as shown. The sheet 153 is preferably coextensive with the film strip 146 and extends over both rows of lamps 130 and 131. Behind this sheet 153 and covering the lower row of lamps 131 only is placed a negative film strip 154a which carries a row of clear display areas or "windows" 150 having depicted thereon the respective key designations A, B, C, . . . G. As thus arranged the windows 150 and the key designations A, B, C . . . G thereon, will normally remain invisible until a lamp or lamps in the lower row of lamps 131 are energized, whereupon the letters A, B, C, . . . G become visible on an illuminated background formed by the windows 150. Therefore, the windows 150 and the key letters A, B, C, . . . G are shown in FIG. 6 in dotted lines.

Behind the upper portion of the sheet of white plastic 153, is placed a strip of colored light-transmitting material 154, such as red Cellophane. This strip lies in front of the upper row of lamps 130 only so that when any of said lamps is energized, the corresponding display window 149 shows "red." Covering the front face of the film strip 146 is a clear sheet or panel member 155 which may be of Plexiglas or similar transparent material.

In view of the fact that the lower manual or keyboard of an organ is generally employed to furnish the proper chords to accompany the melody as played on the upper manual, I provide on the panel or strip 146 and on the white key areas 148 thereof chord indicia as shown at 160. The chord indicia 160 may be depicted by solid letters of contrasting color on center portions of the white key areas 148, the chord indicia 160 comprising letters such as C, D, F, G by which the chords most often played, are identified.

It will be noted that the rear portion of the lamp box 127 is cut away as at 127a in order to conform to a trim strip (not shown) on an organ for which this display device was designed and that the closure plate 156a and the lamp supporting plate 138 are similarly contoured. Thus it is of course understood that the keyboard indicators may be modified as needed to conform to the instrument with which they are to be used.

In FIGURE 3 I have shown more or less diagrammatically the manner in which the keyboard signal or display devices L and L' of FIGS. 4 to 7 are associated with the manuals of a two manual organ. While the display devices may be properly oriented with the keys of any desired octaves on the respective manuals, I have shown in FIG. 3, by way of example only, the display devices oriented with respect to middle "C" so that the keyboard indicator L on the upper manual extends generally from middle "C" upward or to the right as viewed in FIG. 3 and the keyboard indicator L' on the lower manual extends downward or to the left of middle "C" as viewed in FIG. 3.

One additional feature of the invention is that it provides means whereby the student or trainee may "supervise" his own performance on the keyboard with respect to accuracy of choosing the proper key to be played in response to the reception of plural stimuli effective through his senses of sight and hearing. To this end, I have shown diagrammatically in FIG. 2 an ear phone attachment 57 by which the trainee may "plug in" on the loudspeaker or other sound producing facility of the organ 24 in order to hear the tone produced by the organ as a result of his actuation of a given key. To facilitate this operation, the head set or ear phones 57 are connected to a plug 58 which may be inserted in a jack 59 connected in a known manner to the loudspeaker circuit of the organ 24 in a manner so that when plugged in, the plug connection will function to cut out of the circuit, the loudspeaker of the organ and connect the ear phones thereto.

It will be understood, of course, that the earphones here referred to fit loosely about the ears of the pupil and will not interfere with the reception of sound by him, emanating from the loudspeaker 15. I have included in FIG. 2 rather diagrammatically the arrangement of the plug and jack connection just refererd to. In this figure it will be seen that the circuit to the loudspeaker of the organ is normally closed through the jack but that on insertion of the plug 58 into the jack 59 the head of the jack will engage and open the switch which normally maintains the loudspeaker circuit closed and simultaneously will connect the earphones 57 to the sound circuit of the organ.

By way of example, the composite sound track 2 on the tape 1 may include a complete "lesson" including an introductory narrative acquainting the pupil with the general nature of the instrument, the arrangements of the keyboards, the manner in which a given hand is associated with a keyboard and any other information vital to the comprehension of the lesson by the pupil. During the introductory portions of the narrative, the organ 6 may be softly played so that its sound will furnish a proper musical background for the narration. If desired, during the introductory portion of the narration and before the pupil is required to respond to instructions in the narration, the narrator may refer specifically to given keys and concurrently sound or strike such keys so that the pupil may become acquainted with the sound associated with a given key, and synchronized therewith the signal track may carry a signal impulse which on play back will result in the identification of said key on the display device mounted on the keyboard of the instrument. After the preliminary narration has been completed, the narrator will give specific instructions to the pupil to play predetermined keys in a given sequence and as previously described, the signal track will carry modulated portions in code corresponding to the keys to which specific reference has been made, so that proper and selected response to these modulations will, on play back, appear on the display device as accentuated indicia of the particular key involved. During this portion of the narration, the metronome as shown at 7 may be in operation in order that a proper audible beat may appear in the play back.

The lesson or narrated instruction may include any appropriate material and may be of any desired length, and the reel carrying the composite tape may be readily applied to and removed from a conventional tape recorder without the necessity of there being present during the lesson, an operator or instructor.

It will be understood that while the illustrated embodiment of the invention described herein has been limited to a lesson directed to a single pupil, it is within the concept of the invention to utilize the method described herein as a means for instruction of a plurality or group of students in which event a display device carrying a pictorial representation of the keys of the instrument on which instruction is being made, might be displayed on a large scale on a platform in an auditorium and with proper and similar circuitry as herein described said display device would be actuated in response to play back of a composite tape such as herein described, in a manner such that a large audience or a large group of pupils or trainees might all receive simultaneously, synchronized stimuli effective upon their respective sight and hearing senses, with the same advantages as have hereinbefore been related.

As an alternative method of instruction for a group of students or trainees, each of said pupils may be seated at an organ such as shown in FIG. 3, and each such organ may be equipped with keyboard indicators or display devices L and L' such as shown in FIGS. 4 to 7. The circuitry previously described would be modified to the extent that multiple circuits would be controlled by relays such as shown at 16, 17 and 18 in FIG. 2, and an appropriate circuit from each relay would run to a corresponding key signal on each indicator or display device so that all of the indicators would respond in unison to electric impulses selectively delivered to the several relays.

It should also be understood that while the invention has been herein described as including relays selectively responsive to coded impulses appearing on the modulated signal track of the composite tape, and these relays employed to selectively actuate proper indicia on a display device, the invention is not restricted in use to such limited use of the electrical impulses resulting from the modulated area of the signal track. It is within the concept of the invention to provide coded signals, if desired, which may be utilized in selectively energizing relays which may be employed to control other visual or audio facilities performing additional visual and/or audio aids to the lesson to make the same more complete and comprehensive. By way of example, there may be relays which control slide projectors, movie projectors, pointers or similar apparatus.

In the circuit diagrams shown in FIGS. 1 and 2 it will be noted that conventional control switches, sources of electrical potential, amplifiers, and motors for driving the tape in the recording and reproducing apparatus, have been omitted to simplify the diagram but it is of course understood that such well-known appurtenances may be operated as desired to accomplish the results clearly described in the foregoing specification.

It will be understood that the specific example herein given and described is but for the purpose of example only and that various changes and modifications in the parts herein described may be made without departing from the spirit of the invention which is set forth in the appended claims.

I claim:

1. A multi-layer front panel structure for a lamp box housing two spaced rows of lamps, said panel including a sheet of light-transmitting material adapted to overlie only that part of the lamp box occupied by one of said rows of lamps, a second sheet of light-transmitting material adapted to overlie said first-mentioned sheet and dimensioned to cover that portion of the lamp box occupied by both rows of lamps, said second sheet being of contrasting color, a third panel sheet coextensive with said second sheet and having indicia on its exposed face, said indicia including a row of light-transmitting areas adapted to overlie and to be respectively aligned with said first row of lamps in said lamp box, and a second row of light-transmitting areas adapted to be aligned with said second row of lamps.

2. The structure described in claim 1 wherein an outer panel member of transparent material overlies the indicia bearing face of said third-mentioned sheet and is substantially coextensive therewith.

3. The structure described in claim 2 wherein the indicia on said third-mentioned sheet includes a pictorial representation of keys included in the keyboard of a musical instrument, and depicting both black keys and white keys, and wherein the light-transmitting areas adapted to be aligned with said first row of lamps are disposed in the area of said sheet representing the black keys and wherein the light-transmitting areas adapted to be aligned with the second row of lamps are disposed in the area of the sheet which represents the white keys, there being one light-transmitting area on each of the black keys and on each of the white keys.

4. The structure described in claim 3 wherein said areas of the sheet which represent the white keys bear indicia representing the position on a musical staff of a note represented by said key.

References Cited

UNITED STATES PATENTS

| | | | |
|---|---|---|---|
| 1,324,276 | 12/1919 | Schantz | 84—478 |
| 1,696,901 | 1/1929 | Bostelman | 84—478 |
| 2,223,009 | 11/1940 | Rupp et al. | 84—478 |
| 2,412,061 | 12/1946 | Quidas | 35—35 |
| 2,547,535 | 4/1951 | Pierce et al. | 84—478 |
| 3,026,634 | 3/1962 | Irazoqui | 35—35 |
| 3,153,365 | 10/1964 | Redmond | 84—478 |
| 3,155,000 | 11/1964 | Gnatt | 84—478 |

FOREIGN PATENTS

| | | |
|---|---|---|
| 1,173,777 | 9/1962 | Germany. |

STEPHEN J. TOMSKY, *Primary Examiner.*

RICHARD WILKINSON, *Examiner.*

CHARLES OVERBEY, *Assistant Examiner.*